(12) United States Patent
Johnson

(10) Patent No.: US 6,652,042 B2
(45) Date of Patent: Nov. 25, 2003

(54) LOCKING SYSTEM FOR AIR BRAKES OF PARKED TRAILER

(76) Inventor: James J. Johnson, 365 Deguire Apartment 304, Ville Saint-Laurent, Quebec (CA), H4N 2T8

( * ) Notice: Subject to any disclaimer, the term of this patent is extended or adjusted under 35 U.S.C. 154(b) by 55 days.

(21) Appl. No.: 10/046,904

(22) Filed: Jan. 17, 2002

(65) Prior Publication Data

US 2003/0132663 A1 Jul. 17, 2003

(51) Int. Cl.⁷ ............................................. B60T 7/20
(52) U.S. Cl. .................. 303/123; 303/89; 188/112 R; 188/265; 137/899; 180/287; 280/428
(58) Field of Search .................. 303/89, 7, DIG. 3, 303/123; 188/353, 122 R, 265; 70/179, 180, 491, 181, 176; 137/385, 383, 899; 180/287; 280/428

(56) References Cited

U.S. PATENT DOCUMENTS

| | | | | |
|---|---|---|---|---|
| 3,625,573 A | * | 12/1971 | Conn | 303/89 |
| 3,746,403 A | | 7/1973 | Jones et al. | |
| 3,770,324 A | | 11/1973 | Stevenson et al. | |
| 3,780,822 A | | 12/1973 | Frey | |
| 4,018,314 A | * | 4/1977 | Richmond et al. | 188/353 |
| 4,040,675 A | * | 8/1977 | Richmond et al. | 303/89 |
| 4,543,984 A | * | 10/1985 | Murray | 137/385 |
| 4,614,357 A | * | 9/1986 | Murray | 280/507 |
| 4,621,874 A | * | 11/1986 | Gustafsson | 303/89 |
| 4,793,661 A | | 12/1988 | Munro | |
| 4,900,098 A | | 2/1990 | Kuhn et al. | |
| 4,946,130 A | * | 8/1990 | Kooiman | 251/95 |
| 5,145,240 A | * | 9/1992 | Harless et al. | 303/89 |
| 5,297,858 A | * | 3/1994 | Zupan | 303/22.6 |
| 5,375,684 A | * | 12/1994 | Ben Asher et al. | 188/353 |
| 5,378,929 A | | 1/1995 | Mor et al. | |
| 5,390,768 A | | 2/1995 | Borkowski | |
| 5,688,027 A | * | 11/1997 | Johnson | 303/89 |
| 5,747,886 A | * | 5/1998 | Parr et al. | 307/10.2 |
| 5,988,333 A | * | 11/1999 | Catton | 188/353 |
| 6,338,534 B1 | * | 1/2002 | Kee et al. | 303/89 |
| 2001/0050509 A1 | * | 12/2001 | Holt | 303/89 |

FOREIGN PATENT DOCUMENTS

| | | | | |
|---|---|---|---|---|
| GB | 2008192 | * | 5/1979 | 303/89 |
| GB | 2035486 | * | 6/1980 | 303/89 |
| GB | PCT/GB94/01353 | * | 1/1995 | 303/89 |

* cited by examiner

*Primary Examiner*—Christopher P. Schwartz
*Assistant Examiner*—Devon Kramer
(74) *Attorney, Agent, or Firm*—Ogilvy Renault; Guy J. Houle

(57) ABSTRACT

A locking system for trailer air brakes of the type having a supply air line with a gladhand. The locking system comprises a valve connected to the supply air line. The valve is actuatable between an open position, wherein the valve enables air conveyed in the supply air line to disengage the air brakes from the actuated position, and an exhaust position, wherein the valve exhaust air through an exhaust port thereof from the supply air line such that the air brakes remain in the actuated position. A locking device has a portion being automatically displaceable to a locking position when the valve is actuated to the exhaust position so as to lock the valve in the exhaust position, and being displaceable to a disarmed position by manual disarming means for unlocking the locking device and displace the valve to the open position.

13 Claims, 3 Drawing Sheets

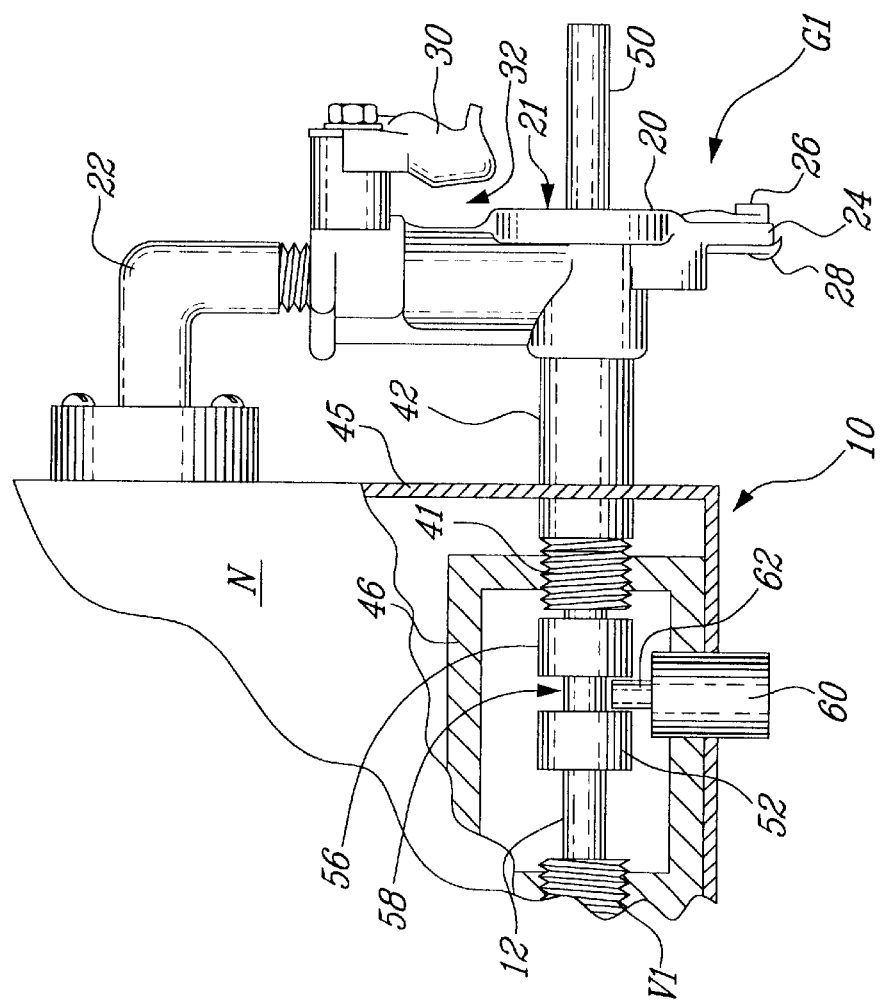
FIG_2

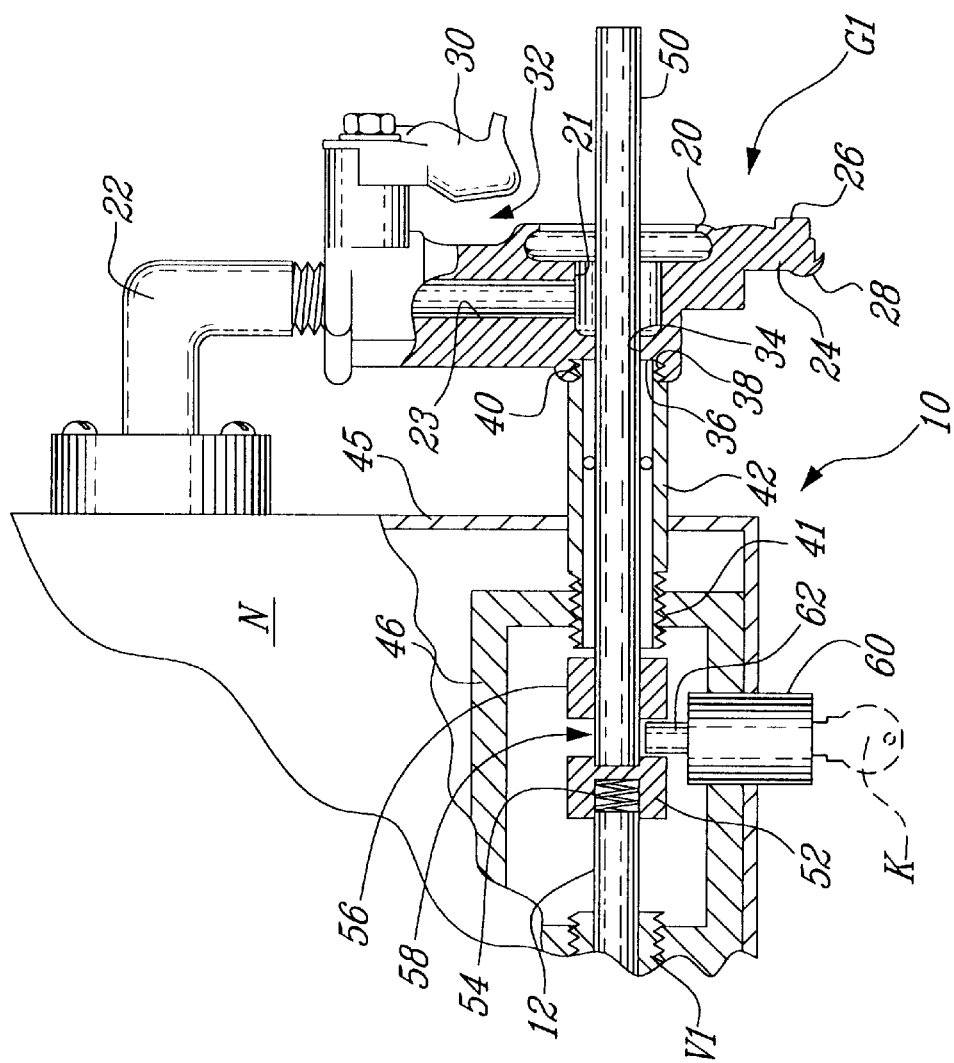
FIG_3

LOCKING SYSTEM FOR AIR BRAKES OF PARKED TRAILER

TECHNICAL FIELD

The present invention generally relates to air brakes for trailers and, more particularly, to a system for locking the air brakes of a parked trailer detached from a tractor.

BACKGROUND ART

Air brakes have evolved over the years in tractor and trailer applications and have thus become safer. One such type of air brake uses two pneumatic circuits in Ad order to provide compressed air to the brakes for actuating them. These brakes are spring-loaded so as to be normally in an actuation position, i.e., such that a trailer has its brakes on when no compressed air is supplied to the brakes. When the trailer is connected to a tractor, a supply air line linking the trailer to the brake system of the tractor supplies compressed air to the brakes so as to disengage them, i.e., keep them in a retracted position. The tractor driver will then actuate the brakes of the trailer via a service air line, which also connects the tractor's brake system to the trailer. The combination of the service air with the springs of the air brakes will surpass the supply air of the supply air line to actuate the brakes of the trailer to the actuation position. The service air may then be exhausted to retract the brakes. This configuration of spring-loaded brakes with supply and service air lines provides an important safety characteristic to these air brakes: in the event of a failure to the supply air line, such as a leak therein, the brakes will be applied automatically. The connections between the tractor's brake system and the supply and service air lines are typically made by gladhands, which are well known air line connectors. The gladhands are typically positioned on both sides of a nose box at a front end of the trailer so as to be connected to the brake system thereof. When the tractor is coupled to the trailer, the supply lines from the tractor are connected to the nose box.

The air brakes utilize air lines which may easily be connected to the air brakes of a tractor. It is, therefore, relatively simple to steal a trailer. Obviously, this presents a plurality of problems, as the trailers are frequently filled with expensive merchandise, making them an attractive prey for thieves. Furthermore, with the quantity of tractors and trailers on the roads nowadays, stolen trailers may go virtually unnoticed.

Various devices and methods have been proposed in order to disable the trailer air brakes such that trailers detached from tractors cannot be stolen. One problem is that trailers very seldom have sophisticated controls nor electrical systems and, therefore, anti-theft devices are mainly mechanical. Although most of these locking systems provide adequate theft prevention, none describes a locking system which arms automatically, i.e., locking systems must be manually armed. An automatic-arming locking system has advantages, one of which is that it does not require that a driver remember to arm the locking system, as it is done automatically. Also, time is saved in the arming of the locking system. Finally, it will prevent the use of air supplies from another system or tractor to deactivate the spring brakes so as to steal the trailer.

SUMMARY OF INVENTION

Therefore, it is a feature of the present invention to provide an automatic-arming locking system for trailer air brakes to prevent theft of a trailer disconnected from a tractor.

According to a broad aspect of the present invention, there is provided a locking system for trailer air brakes of the type having a supply air line with a gladhand for being connected to an air supply from a tractor for disengaging the trailer air brakes from an actuated position. The locking system comprises a valve connected to the trailer supply air line. The valve is actuatable between an open position, wherein the valve enables air conveyed in the trailer supply air line to disengage the trailer air brakes from the actuated position, and an exhaust position, wherein the valve exhausts air through an exhaust port thereof from the trailer supply air line such that the trailer air brakes remain in the actuated position. The valve moves automatically to the exhaust position when the tractor air supply is disconnected from the gladhand so as to cause the trailer air brakes to be engaged in the actuated position. A locking device has a portion being automatically displaceable to a locking position when the valve is actuated to the exhaust position so as to lock the valve in the exhaust position, and being displaceable to a disarmed position by manual disarming means for unlocking the locking device and displace the valve to the open position.

According to a further broad aspect of the present invention, there is provided a method for automatically locking air brakes of a parked trailer in an actuated position, the trailer being of the type having a supply air line with a gladhand for being connected to an air supply from a tractor for disengaging the trailer air brakes from an actuated position. The method comprises the steps of i) providing a valve having a rod automatically displaceable to an extended position when a tractor air supply is disconnected from the gladhand of the trailer, with the rod interfering with the gladhand when displaced to the extended position, and a locking device for automatically locking the rod in the extended position; ii) disconnecting the tractor air supply from the gladhand to engage the air brakes in the actuated position, and simultaneously causing the rod to automatically move to the extended position to interfere with the gladhand; and iii) locking the rod in the extended position by the locking device automatically locking the rod in the extended position, whereby the rod interferes with the gladhand such that air cannot be reconnected to the supply air line for disengaging the trailer air brakes from the actuated position thereof unless the rod is unlocked.

A method for automatically locking air brakes of a parked trailer in an actuated position, the trailer being of the type having a supply air line with a gladhand for being connected to an air supply from a tractor for disengaging the trailer air brakes from an actuated position. The method comprises the steps of i) providing a valve in the supply air line automatically displaceable to an exhaust position when a tractor air supply is disconnected from the gladhand of the trailer, and a locking device for automatically locking the valve in the exhaust position; ii) disconnecting the tractor air supply from the gladhand to engage the air brakes in the actuated position, and simultaneously causing the valve to automatically move to the exhaust position; and iii) locking the valve in the exhaust position by an automatic displacement of the locking device, such that any air supplied to the supply air line is exhausted through the valve, whereby the trailer air brakes are locked in the actuated position unless the valve is unlocked.

BRIEF DESCRIPTION OF DRAWINGS

A preferred embodiment of the present invention will now be described with reference to the accompanying drawings in which:

FIG. 2 is a front elevational view, partly fragmented, of an automatic-arming locking system of the present invention;

FIG. 3 is a front-side cross-sectional view of the air brake locking system.

DESCRIPTION OF PREFERRED EMBODIMENTS

Figure 1:
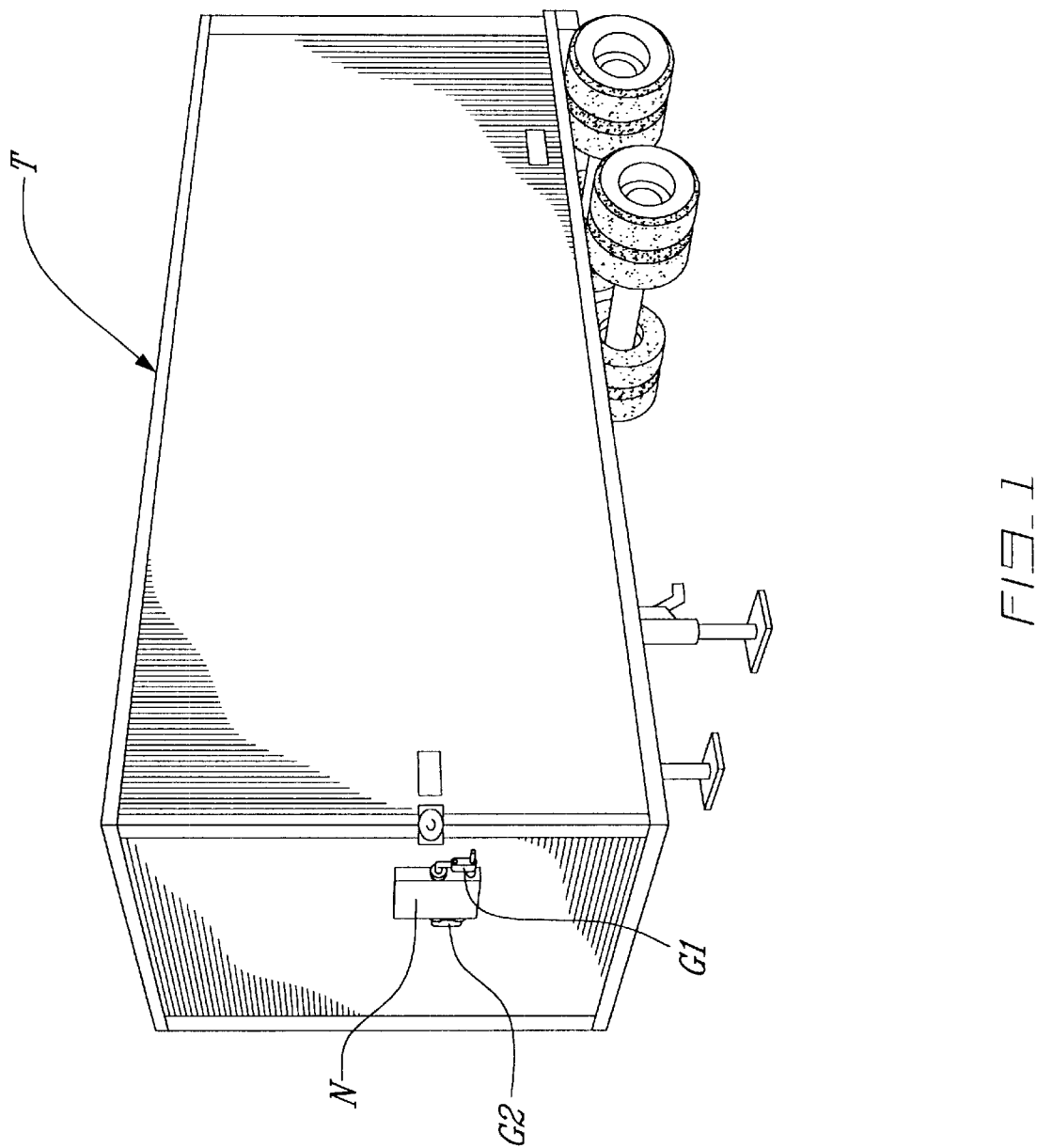
FIG. 1 is a perspective view of a trailer with the automatic-arming locking system in accordance with the present invention.

According to the drawings and, more particularly to FIG. 2, an air brake locking system in accordance with the present invention is generally shown at 10. The automatic-arming locking system 10 is enclosed in a nose box N. As seen in FIG. 1, the nose box N is typically found on a front face of a trailer T, and comprises a supply air line gladhand G1 and a service air line gladhand G2. Compressed air is supplied to the air brake line of the trailer through the supply air line gladhand G1, whereas the brakes are actuated by a compressed air signal through the service air line gladhand G2. As a safety feature, if the air pressure in the supply air line is exhausted, the brakes of the trailer will automatically engage. In this event, the brakes will only be released by repressurizing the supply air line. Therefore, when a trailer is detached from the tractor, the supply air line is depressurized by disconnecting a supply line of the tractor from the gladhand G1 of the trailer. This ensures that the built-up pressure in the supply air line will be released and thus that the brakes are kept in an actuated position. The service air line is also disconnected and the tractor can leave the trailer in a stored and parked condition.

In the locking system 10 of the present invention, a valve V1 is added to the trailer supply air line, downstream of the gladhand G1. The valve V1 is typically a three-way valve with an exhaust position, wherein air enters the valve through an inlet port thereof to then be exhausted by the exhaust port, and an open position, wherein air goes through the valve to an outlet port. The valve V1 has a rod 12 extending between a retracted position, wherein the rod 12 is kept retracted in the valve V1 by the pressure in the supply air line, with the valve V1 being in its open position, and an extended position, as illustrated in FIG. 2, when the supply air line is depressurized by the disconnecting of the gladhand G1 from the tractor brake system. When the rod 12 is in the extended position, the valve V1 is in an exhaust position, such that air supplied to the supply air line will exhaust through the valve V1. Accordingly, air will not reach the brakes, which will consequently remain in their actuated position. The valve V1 is from, for instance, the Bendix PP-1 or PP-8 valve models.

Referring to FIGS. 2 and 3, the gladhand G1, as known in the art, has a connection surface 20 having a bore 21 in the middle thereof. The bore 21 is connected to the supply air line via a channel 23 in the gladhand G1 and an elbow connector 22, whereby air may be supplied to the air line. The gladhand G1 has an ear 24 projecting downwardly from the connection surface 20. The ear 24 defines a portion of an annular section and has a protrusion 26 and a guide portion 28 thereon. A cover plate 30 is positioned above the connection surface 20 and defines a gap 32 with the body of the gladhand G1. Normally, a corresponding gladhand from the tractor, for providing an air supply to the trailer service air line, may be connected to the gladhand G1 by a corresponding connection surface thereof being applied to the connection surface 20 of the gladhand G1, and the tractor gladhand being rotated such that an ear, similar to the ear 24 of the gladhand G1, engages in the gap 32, whereas a similar gap receives the ear 24 of the gladhand G1. The guide portion 28 is received in a corresponding groove in the cover plate of the tractor gladhand to ensure the securing of the gladhands. However, with the locking system of the present invention, a locking pin 50 emerges outwardly from the gladhand G1 as soon as the supply line from the tractor is disconnected. The locking pin 50 may thereafter be retracted partially toward the gladhand G1 to enable a corresponding gladhand to be connected thereto. However, the locking pin 50 is locked inside the nose box N to prevent the corresponding gladhand from being connected to the gladhand G1, and requires a key to be unlocked, to provide for the locking pin 50 to be retracted, as will be described in detail below.

The automatic-arming locking system 10 of the present invention requires the gladhand GL to be modified by providing a through bore 34, concentrically positioned an the bore 21 of the gladhand G1. A counter bore 36, having tapped walls 38, is adapted for receiving a threaded end 40 of a cylindrical tube 42. The cylindrical, tube 42 thus extends from the gladhand G1 to the interior of the nose box N through a through bore in a lateral wall 45 of the nose box N. The opposed end 41 of the cylindrical tube 42 is also threaded and is connected to an inner box 46 within the nose box N. The valve V1 is partially shown with its rod 12. The locking pin 50 is connected to the rod 12 by a bushing 52. The connection between the locking pin 50 and the rod 12 includes a compression spring 54, which keeps the locking pin 50 biased away from the rod 12. A second bushing 56 is positioned between the first bushing 52 and the threaded end 41 of the cylindrical tube 42. An annular gap 58 is thus defined between the first bushing 52 and the second bushing 56. The locking pin 50 extends through the cylindrical tube 42 and the gladhand G1 so as to emerge perpendicularly from the connection surface 20 of the gladhand G1.

A locking device 60, in the form of a key cylinder, has a spring-loaded dog 62 which is constantly upwardly biased. Therefore, when the rod 12 is in its extended position as shown in FIGS. 2 and 3, the annular gap 58 is in register with the dog 62 of the locking device 60. Therefore, the dog 62 extends into the annular gap 58, thereby preventing locking pin 50 from being retracted in the gladhand G1 through the stroke of the rod 12.

As the rod 12 of the valve V1 reaches its extended position as soon as the gladhand G1 and the corresponding gladhand of the tractor are separated from one another, the locking device 60 automatically releases to lock the locking pin 50 at its outermost position with respect to the gladhand G1. Therefore, an air supply cannot be connected to the supply air line via the gladhand G1, as the locking pin 50 disables the possibility of having a mating gladhand connected to the gladhand G1. Furthermore, the valve V1 is stuck in its exhaust position through the rod 12 being held by the dog 62, whereby, if the locking pin 50 were to be cut, air could not be applied to the supply air line as the valve is stuck in its exhaust position and air going through it would be exhausted by the exhaust port thereof. This is an important aspect of the present invention, and may be used even without the locking pin 50 interfering with the gladhand G1. The locking pin 50 may be broken off by a thief having appropriate equipment, whereas the valve V1 and the locking dog 62 of the locking device 60 are protected in the nose box N and in the inner box 46. Therefore, the valve V1, having an exhaust position in which it may be locked by the locking device 60, may be used without the locking pin 50 as an independent locking system. It is understood that the valve V1 is preferably inserted directly in the supply air line when connected to it. If the valve V1 was connected in parallel to the supply air line, one could block the exhaust port of the valve V1 to bypass the exhaust action of the valve V1 on the supply air line. However, by having the valve V1 directly on the supply air line, the valve V1 must be in its open position for air to be supplied to the brakes, whereby the locking device 60 must be unlocked.

In order to retract the dog 62 in the locking device 60 to allow the rod 12 and locking pin 50 to retract for the connection of mating gladhands, a key K is required to be inserted into the cylinder 60 to retract the dog 62. Furthermore, the locking system 10 is partially accommodated in the inner box 46, which is sealed closed and of anti-theft construction so as to prevent the locking system 10 from being broken into. Therefore, when the gladhand G1 is to be connected with the tractor gladhand, the dog 62 is retracted by operating the key K and the locking pin 50 is pushed in against the action of the valve V1. The compression spring 54 is provided for instances where the tractor gladhand, which is to be connected to the trailer gladhand G1, is too small to accommodate a portion of the locking pin 50 while being mated to the gladhand G1, i.e. the rod 12 of the valve V1 cannot retract more. Accordingly, the compression spring 54 allows for the locking pin 50 to move inwardly toward the rod 12, so as to allow the gladhands to be connected.

Also, the locking pin 50 has a seal on its outer periphery within the cylindrical tube 42, so as to prevent air, which fills the gladhand G1 when the locking system 10 is retracted, from escaping therefrom. It is pointed out that the locking system 10 of the present invention has no bearing on the operation of the tractor, with regards to the actuation of the trailer brakes. Once the trailer is hooked up to the tractor, the air brakes of the trailer as actuated by the tractor are operated the same as they were without the locking system 10. The locking system 10 may be installed on the trailer without having to modify the configuration of the tractor brakes.

It is within the ambit of the present invention to cover any obvious modifications of the embodiments described herein, provided such modifications fall within the scope of the appended claims.

What is claimed is:

1. A locking system for trailer air brakes of the type having a supply air line with a gladhand for being connected to an air supply from a tractor for disengaging the trailer air brakes from an actuated position, said locking system comprising:
    a valve connected to the trailer supply air line, said valve being actuatable between an open position, wherein said valve enables air conveyed in the trailer supply air line to disengage the trailer air brakes from the actuated position, and an exhaust position, wherein said valve exhaust air through an exhaust port thereof from the trailer supply air line such that the trailer air brakes remain in the actuated position, said valve moving automatically to said exhaust position when the tractor air supply is disconnected from the gladhand so as to cause the trailer air brakes to be engaged in the actuated position; and
    a locking device having a portion being automatically displaceable to a locking position when said valve is actuated to said exhaust position so as to lock said valve in said exhaust position, and being displaceable to a disarmed position by manual disarming means for unlocking said locking device and displace said valve to said open position.

2. The locking system according to claim 1, wherein said valve has a displaceable rod, said rod being in a retracted position when said valve is in said open position, wherein said rod is generally retracted in said valve, and in an extended position when said valve is in said exhaust position; and
    said portion of said locking device is a rod engaging portion displaceable between said locking position of said locking device, wherein said rod engaging position arrests said rod of said valve in said extended position, and said disarmed position of said locking device, wherein said rod engaging portion is generally retracted within said locking device so as to not interfere with said rod of said valve, said rod engaging portion automatically releasing to said locking position with said rod extending to said extended position, and said rod engaging portion displaceable from said locking position to said disarmed position through manual means for unlocking said locking device.

3. The locking system according to claim 2, wherein said rod in said extended position substantially interferes with the gladhand such that a tractor air supply may not be connected to the gladhand.

4. The locking system according to claim 3, wherein said manual means for unlocking the locking device is a key.

5. The locking system according to claim 2, wherein said locking device is a key cylinder having a spring-loaded dog constituting said rod engaging portion, and a key slot in said key cylinder accessible from outside of a nose box of the trailer, said spring-loaded dog being positioned within the nose box.

6. The locking system according to claim 3, wherein said rod of said valve is guided to extend through a central bore of said gladhand.

7. The locking system according to claim 6, wherein said rod of said valve has a pair of bushings thereon, said bushings being spaced so as to define a gap for receiving therein said spring-loaded dog, said spring-loaded dog having a free end portion dimensioned to extend in said annular gap when said rod is displaced to said locking position so as to arrest said rod in said extended position.

8. The locking system according to claim 7, wherein said rod has a spring portion separating a first portion thereof from a second portion thereof, said spring portion biasing said second portion of said rod outwardly of said gladhand so as to increase a stroke of said rod.

9. A method for automatically locking air brakes of a parked trailer in an actuated position, the trailer being of the type having a supply air line with a gladhand for being connected to an air supply from a tractor for disengaging the trailer air brakes from an actuated position, said method comprising the steps of:
    i) providing a valve having a rod automatically displaceable to an extended position when a tractor air supply is disconnected from the gladhand of the trailer, with said rod interfering with said gladhand when displaced to said extended position, and a locking device for automatically locking said rod in said extended position;
    ii) disconnecting the tractor air supply from said gladhand to engage the air brakes in the actuated position, and simultaneously causing said rod to automatically move to the extended position to interfere with said gladhand; and
    iii) locking said rod in said extended position by said locking device automatically locking said rod in said extended position, whereby said rod interferes with said gladhand such that air cannot be reconnected to the supply air line for disengaging the trailer air brakes from the actuated position thereof unless said rod is unlocked.

10. The method according to claim 9, further comprising steps for unlocking said rod from said unlocking position, consisting of:
    iv) releasing said locking device from locking said rod of said valve by manual unlocking means; and v) displacing said rod of said valve out of said extended position by exerting an axial force thereon when connecting said air supply of the tractor to said gladhand.

11. The method according to claim 10, wherein said locking device is a key cylinder having a spring-loaded dog biased against said rod and automatically moving in a locking cavity of said rod when said rod is in said extended position, said step (iv) comprising inserting a key in said cylinder and rotating said key to withdraw said dog from said locking cavity.

12. A method for automatically locking air brakes of a parked trailer in an actuated position, the trailer being of the type having a supply air line with a gladhand for being connected to an air supply from a tractor for disengaging the trailer air brakes from an actuated position, said method comprising the steps of:

i) providing a valve in the supply air line automatically displaceable to an exhaust position when a tractor air supply is disconnected from the gladhand of the trailer, and a locking device for automatically locking said valve in said exhaust position;

ii) disconnecting the tractor air supply from said gladhand to engage the air brakes in the actuated position, and simultaneously causing said valve to automatically move to the exhaust position; and iii) locking said valve in said exhaust position by an automatic displacement of said locking device, such that any air supplied to the supply air line is exhausted through said valve, whereby the trailer air brakes are locked in the actuated position unless said valve is unlocked.

13. The method according to claim 12, wherein releasing said locking device from locking said valve is executed by manual unlocking means.

* * * * *